Oct. 23, 1956  R. A. MENGELKAMP ET AL  2,767,691
DUAL-FUEL ENGINES AND PROCESSES OF OPERATING SAME
Filed Feb. 7, 1955  3 Sheets-Sheet 2

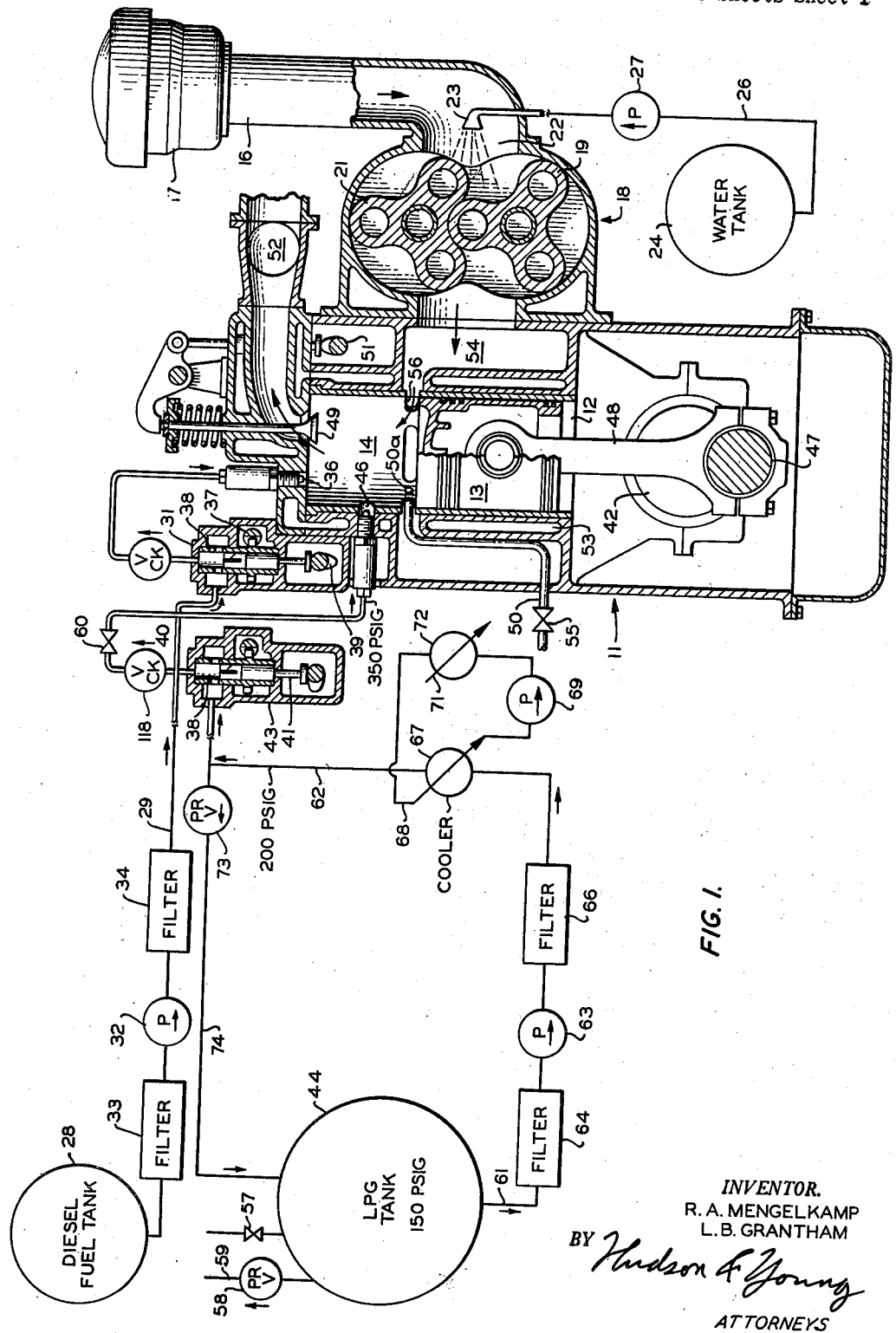

AIR IN SCAVENGING

LPG INJECTION

PILOT OIL INJECTION

IGNITION

EXHAUST

INVENTOR.
R. A. MENGELKAMP
L. B. GRANTHAM
BY Hudson & Young
ATTORNEYS

INVENTOR.
R. A. MENGELKAMP
L. B. GRANTHAM
BY
ATTORNEYS

# United States Patent Office 2,767,691
Patented Oct. 23, 1956

2,767,691

DUAL-FUEL ENGINES AND PROCESSES OF OPERATING SAME

Richard A. Mengelkamp and Lloyd B. Grantham, Bartlesville, Okla., assignors to Phillips Petroleum Company, a corporation of Delaware Application February 7, 1955, Serial No. 486,512

14 Claims. (Cl. 123—1)

This invention relates to dual-fuel engines and processes of operating the same. In one aspect it relates to dual-fuel engines operating solely by compression-ignition. In another aspect it relates to dual-fuel engines in which compression-ignition is either supplemented or aided by spark plug ignition, or by glow plug ignition. In another aspect it relates to dual-fuel engines in which there is injected a first liquefied normally gaseous fuel and a second liquid normally liquid fuel.

In the prior art dual-fuel engines have been employed in which a first gaseous fuel is compressed in the combustion chamber of an internal combustion engine, and then a liquid normally liquid fuel is injected as a liquid spray to initiate ignition by compression-ignition alone, or with the aid of spark ignition, or glow plug ignition. These processes of the prior art have proved inefficient because it was necessary to maintain the density of the vaporized fuel substantially constant in order to obtain the proper combustion mixture, which is difficult when the first fuel is introduced as a gas. Furthermore, the storage of the major portion of the fuel in gaseous form is too bulky, and it is cumbersome to store fuel in liquefied form and then evaporate the same to a gas in a separate vaporizing system before use as fuel. Both modifications of the prior art listed in this paragraph are also inefficient by loss of unburned fuel out the exhaust during scavenging, and by waste of heat energy and failure to pack as much fuel-air mixture into the cylinders at the higher temperature of the vaporized gas instead of the lower temperature achieved when the latent heat of vaporization is taken right out of the air being compressed in the cylinders in the present invention.

The present invention solves these difficulties of the prior art, while at the same time giving a greater brake horsepower (knock limited) when the first fuel is injected as a liquid spray, than occurs when the first fuel is injected in gaseous form. At the same time with the liquefied normally gaseous fuel the engine has a lower specific fuel consumption in thousands of B. t. u./B. H. P.-hr. (British thermal units per brake horsepower hour) than the same material injected in gaseous form, as will be evident from Table I.

One object of this invention is to provide an improved dual-fuel engine to obtain improved combustion and increased power, and to provide processes for operating the same.

Another object is to provide a dual-fuel engine and a process for operating the same using a liquefied normally gaseous fuel as the first injected fuel to obtain an increased knock-limited brake horsepower, and lower specific fuel consumption, from said engine.

Another object of this invention is to provide a liquefied fuel system in which the high vapor pressure fuels may be metered under pressure and in the liquid phase and injected directly as a liquid spray into the combustion chamber of the engine, whereby the heat of vaporization is supplied by the gases being compressed in said chamber, thereby increasing the efficiency of said engine and process.

Numerous other objects, and advantages, will be apparent to those skilled in the art upon reading the accompanying specification, claims and drawings.

In the drawings:

Figure 1 is a diagrammatic elevational view of a dual-fuel internal-combustion engine of the 2-stroke cycle compression-ignition type embodying the present invention, with parts of the engine broken away and shown in section to better illustrate details of construction.

Figure 2A:
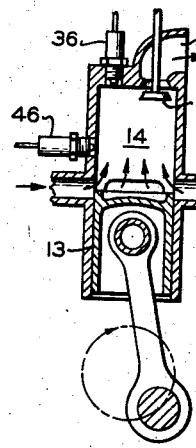
Figures 2a, 2b, 2c, 2d and 2e are simplified cross-sectional views which show the cycle of operation of the engine of Figure 1 at five points spaced in its cycle.

During the past few years liquefied petroleum gas, generally comprising propane and butane, has come into considerable use as a fuel in internal combustion engines. The advantages of a liquefied petroleum gas as an internal combustion engine fuel are well known. In actual practice it has been found that in order to convert these fuels from liquid phase to vapor phase it necessitated the use of bulky and difficult to operate vaporizing units.

We have now found that by injecting high vapor pressure fuels such as the above in the liquid phase directly into the working cylinder of a compression-ignition engine we obtain increased knock-limited brake horsepower and lower specific fuel consumption.

This invention relates to an improved method of operating compression-ignition engines, which are usually dual-fuel engines, to obtain increased knock-limited brake horsepower and lower specific fuel consumption, said method comprising a liquid fuel system in which a high vapor pressure fuel, such as LPG, is metered under pressure and in the liquid phase, and is injected directly as a liquid into the interior of a working cylinder of the engine. Preferably, the fuel is all or substantially all introduced into the cylinder prior to ignition.

In a conventional dual-fuel diesel engine, a small pilot charge of diesel fuel is supplied to the cylinder of the engine to ignite a larger amount of gaseous hydrocarbon fuel also supplied to the cylinder of the engine earlier in the cycle. This type of engine is usually started on straight diesel fuel using a diesel fuel charge substantially larger than the pilot charge, and after operation of the engine has been established, the volume of the diesel fuel charge is reduced to the pilot charge when the gaseous hydrocarbon fuel is supplied to the engine. This invention is concerned with the use of a liquid fuel, such as LPG, and a system for handling such a fuel in the operation of a dual-fuel engine, wherein the hydrocarbon fuel is injected directly as a liquid into the cylinder of the engine.

An important feature of the present invention is that sufficient pressure is imposed upon the fuel to keep the fuel liquefied up to the discharge or injection point. Since the fuel is injected as a liquid without the requirement of prior volatilization, the presence of relatively nonvolatile constituents in the liquid fuel, such as tetra ethyl lead compounds, castor oil, lubricating oil upper cylinder lubricant, and anti-rust additives, is completely unobjectionable. The method of injecting fuel according to the present invention presents great advantages over conventional methods involving vaporization. In the first place, our method eliminates the need for bulky and difficultly operable vaporizing units which have hitherto been necessary to convert all of the liquefied fuel into gas. In the prior handling of completely gasified fuel it was necessary to maintain the density of the vaporized fuel substantially constant in order to obtain the proper combustion mixture. This requirement of uniform density in the gas mixture required the use of isobaric and thermostatic devices to maintain the gas at constant pressure and temperature, all of which become unnecessary in the present method. A very important advantage occurring from our method of injecting the normally gaseous fuel constituents in a liquefied form arises from the fact that their vaporization takes place in direct heat exchange relationship with the combustion air whereby the latent heat of vaporization becomes available for cooling of the combustion air and fuel forming the charge in the cylinder with resultant increases in volumetric efficiency. With our method, atomization, disruption, and dispersion of the fuel in the combustion air within the cylinder are automatically had to a very enhanced degree. Because of the relatively high pressure under which the fuel is maintained up to the point of discharge, a large amount of energy proportional to the pressure drop across the discharge nozzle becomes available for disruption and atomization of the liquid fuel. Other advantages incident upon the injection of liquid high vapor pressure fuel are as follows. The almost immediate vaporization of the normally gaseous constituents insures very early mixing of the fuel and air in the cylinder whereby a very homogeneous air-fuel mixture is obtained. The distribution quality of such a mixture is particularly good, each cylinder of the engine receiving a mixture of substantially the same composition.

In Figure 1 a dual-fuel internal-combustion engine generally designated as 11 is provided with a cylinder 12 and a piston 13 reciprocating in said cylinder and thereby forming a variable volume combustion chamber 14. This engine may be regarded as any 2-stroke cycle dual-fuel internal-combustion compression-ignition engine, but many of the specific features of construction will be seen to be the same as the General Motor Series "GM3-71 Two-Cycle Three Cylinder Diesel Engine" with the exception of certain modifications which will be explained below.

This engine 11 has an air intake 16 which may be provided with a conventional air filter 17 to remove dust from the air drawn therethrough into manifold 16 if desired. Intake manifold 16 leads to the inlet side of an air pump, or blower 18, preferably of the gear-type shown employing two rotating intermeshed gears 19 and 21. When water injection is desired a spray of water can be blown into the intake 22 of the blower 18 through a spray head 23, the water coming from tank 24 through line 26 pumped by pump 27. By stopping pump 27, the engine may be operated without water injection whenever desired. The chamber 14 is hot enough at all times so that the water from spray 23 will evaporate, and not be frozen, thereby adding the well known advantages of water injection, which is especially valuable under rich mixture, and/or heavy load conditions, and/or conditions of incipient knocking.

This GM3-71 diesel engine 11 of Figure 1 is already provided with a diesel fuel tank 28 for containing liquid, normally liquid, fuel, having a cetane number higher than 22, and preferably a cetane number above 35, under atmospheric pressure. The diesel fuel is drawn from tank 28 through diesel fuel supply line 29 into cam-operated injection pump 31 by gravity and/or pump 32, it being preferable to pass the fuel through a plurality of filters 33 and 34 to minimize possibility of some solid particles plugging the small openings in injection nozzle 36.

Any standard type of injection pump may be employed as pump 31, and as the one shown is a Bosch model APE diesel fuel injection pump it is not believed necessary to go into details of construction thereof, except to state that movement of control rack 37 perpendicular to the plane of the drawing rotates geared sleeve 38 to vary the volume of liquid pumped with each stroke, and the individual strokes are timed by cam 39 moving the pump piston rod 41, cam 39 being on a cam shaft geared with proper relation to crankshaft 42 and the position of piston 13. Because of the difference in timing of the injection of fuel in each cylinder, if there are a plurality of cylinders in the engine, there should be a separate diesel fuel injection pump 31 and injector 36 for each cylinder, pipe 29 being connected to a manifold supplying each of these pumps.

A pump 43 similar to pump 31 is also supplied for each cylinder for the injection of the liquefied normally gaseous fuel from tank 44, and the cam shafts of cams 39 of the two sets of pumps can be operated together as indicated by the dotted lines joining them. Racks 37 and 40 are operated independently.

In starting the engine, rack 40 is adjusted so that pump 43 does not pump any liquid to nozzle 46 and rack 37 is adjusted so that pump 31 pumps an increased quantity of diesel fuel to the engine. As soon as engine 11 has warmed up, rack 37 is moved so that pump 31 pumps merely enough diesel fuel through nozzle 36 to ignite the charge while rack 40 is moved to vary the amount of liquefied normally gaseous fuel supply to nozzle 46. Pumps 31 and 43 supply their respective liquids to their nozzles 36 and 46 at about 600 p. s. i. g. for diesel fuel and 350 p. s. i. g. for the liquefied normally gaseous fuel and check valves may be supplied as shown as desired to prevent back flow from the nozzles.

These additional injection pumps 43 and injector 46 are not a part of the GM3-71 engine but are only supplied by the present invention.

In order to make comparative tests with the engine 11 of Figure 1 between liquid and gaseous propane and other fuel gases it was necessary to provide an additional feed line 50 for gases, which can be closed off with valve 55 when practicing the present invention. Line 50 was positioned to pass fuel gases directly into cylinder 14 through an opening 50A. As line 50 and opening 50A are not part of the present invention, no description of the means to supply measured constant rates of flow of gaseous propane, or other gases, to line 50 is shown, but gas supply means known to the prior art was employed in these comparative tests. Valve 60 is open in the practice of the present invention and is not needed, except to shut off the liquid propane when making comparative tests with gaseous propane, or other gases, added through line 50.

The GM3-71 engine has the usual connecting rod bearing 47 on crankshaft 42 for each cylinder 14 connected to piston 13 by the usual connecting rod 48, and in the cylinder head is the usual exhaust valve or valves 49 driven from cam shaft 51 geared to crankshaft 42 for allowing exhaust of gases into exhaust manifold 52 during a portion of the cycle. Only one exhaust valve 49 is shown, although the engine used had two of them in each cylinder, and even more can be used. The engine may be air-cooled but preferably is cooled by indirect heat exchange with water passing through the water jacket 53.

Free-oxygen containing gas preferably air enters in the engine from compressor 18 through intake manifold 54 and into the individual cylinders 14 through inlet ports 56 whenever piston 13 is in a position uncovering ports 56 as shown.

The liquefied normally gaseous fuel in tank 44 may be any such fuel, but preferably comprises essentially a hydrocarbon selected from the group consisting of hydrocarbons having from one to five carbon atoms in each molecule thereof, and mixtures of such hydrocarbons, and is preferably stored in tank 44 at the vapor pressure of said fuel at atmospheric temperature. Any one, or any mixture of any or all of these hydrocarbons are operative, but it is obviously preferable to employ propane or butane as at least a major substituent of the liquefied normally gaseous fuel, because, for example, pentane is not volatile enough to get as valuable results, and methane if present in excessive proportions will raise the vapor pressure above the limits of practicality. Obviously the critical temperature of the liquefied normally gaseous fuel in tank 44 must be such that the fuel will remain liquid under its vapor pressure at atmospheric temperature, as it is not desired to apply refrigeration (not shown) to a tank 44 merely to keep the fuel liquid.

Tank 44 may be supplied with the usual filling line valve 57 and emergency pressure relief valve 58 in a vent stack 59 leading to a safe point of disposal, and all the other desired equipment for such tanks may be selected from the prior art, but are not shown because not essential.

The liquefied normally gaseous fuel in tank 44, if propane, at the average atmospheric temperature is at about 150 p. s. i. g. (pounds per square inch gauge pressure) and is pumped through lines 61 and 62 by pump 63, which may be any suitable type of pump such as centrifugal pump, piston pump, or gear pump. The pressure in line 26 is raised a substantial amount above the vapor pressure in tank 44, for example, to about 200 p. s. i. g. for propane, in order to insure that it will remain liquid in line 62 and injection pump 43. Filters 64 and 66 may be provided to keep solid particles out of pump 43 and nozzle 46. As a further insurance that the fuel in line 62, pump 43 and nozzle 46 will remain liquid, it is preferably also passed through cooler 67 in indirect heat exchange with a suitable cooling fluid 68, which could be the atmosphere, but preferably is the water circulated by pump 69 which can be driven by engine 11 and the cooling fluid is cooled by the atmosphere 71 in a suitable radiator 72.

Obviously pumps 63 and 69 may be separately driven, but are preferably geared to crankshaft 42 and driven thereby, and the passage of air 71 through radiator 72 may be augmented by a fan (not shown) also geared to crankshaft 42.

In order to prevent pump 63 from supplying the liquid in line 62 at too high a pressure and to flush out vapor, a pressure relief valve 73 may be provided for relieving the liquid in line 62 into a return line 74 through which it returns to tank 44.

When engine 11 of Figure 1 is a converted GM3-71 engine and propane is the liquefied normally gaseous fuel from 44 about 12 to 13 cubic millimeters per cylinder per explosion, of said diesel fuel from 28 is employed and the remainder of the fuel is LPG from tank 44.

It has been found that lubrication is not required for the plunger and barrel 38 of pump 43 as long as this portion of the pump contains liquid LPG (liquefied petroleum gas). The remainder of the pump can be lubricated with the same oil used to lubricate the crankcase of engine 11. The same is true of pump 31 except that diesel oil is lubricating the plunger.

Figures 2a, 2b, 2c, 2d and 2e are simplified cross-sectional views showing the cycle of operation of the engine 11 of Figure 1 at five points spaced in its cycle. This engine is what is known as a 2-cycle engine, or more accurately should be designated a 2-stroke cycle engine because the cycle is completed in two strokes of the reciprocating piston as it moves one way during each stroke, in which there is a first air scavenging and compression stroke, and a second power and exhaust stroke.

Starting the cycle in Figure 2a it will be noted that exhaust valve 49 is open and piston 13 in its downward movement has just cleared intake ports 56. Air from compressor 18 of Figure 1 enters combustion chamber 14 through ports 56 and scavenges the burned gases out through exhaust valves 49 into exhaust manifold 52.

Figure 2B:
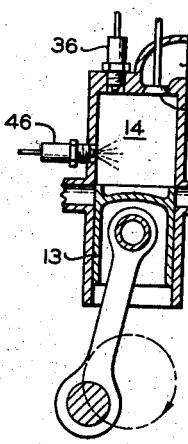

In Figure 2b piston 13 has passed bottom dead center and exhaust valves 49 and air intake ports 56 have closed and at that moment it is preferred to commence the injection of liquefied normally gaseous fuel. However, fuel injection can begin anytime after bottom dead center. It should be realized that some variation in angle of crankshaft and resulting piston position can exist in the practice of the present invention, but it is preferred to make these injections about at the points noted, and it will be noted that it is preferred to have exhaust valve 49 and intake ports 56 close about the time the injection commences through nozzle 46 in order that fuel will not be wasted unburned into exhaust pipe 52.

Figure 2C:
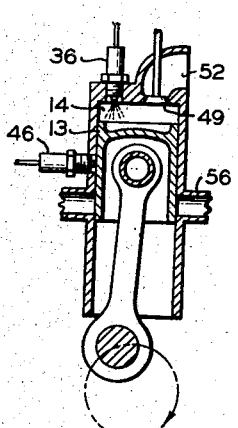

Figure 2c shows the position of the piston as the injection of diesel fuel through nozzle 36 commences, and this preferably occurs at a point near top dead center, a little before, after, or exactly at top dead center, depending on the cetane number of the diesel fuel and whether there is auxiliary ignition means (described below), or not, so that ignition of the major portion charge in the cylinders occurs at approximately 10° after top dead center.

Figure 2D:
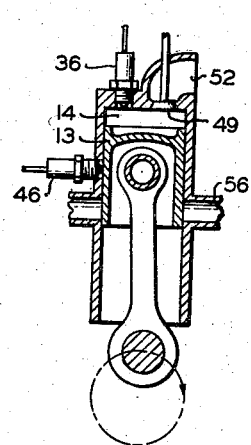

The moment of this ignition is shown in Figure 2d, which is the start of the power and exhaust stroke.

Figure 2E:
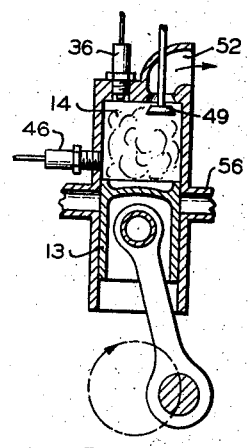

The latter part of the power and exhaust stroke is shown in Figure 2e at which time the exhaust valve 49 first opens and burned gas under pressure commences passing out the exhaust 52.

Figure 3:
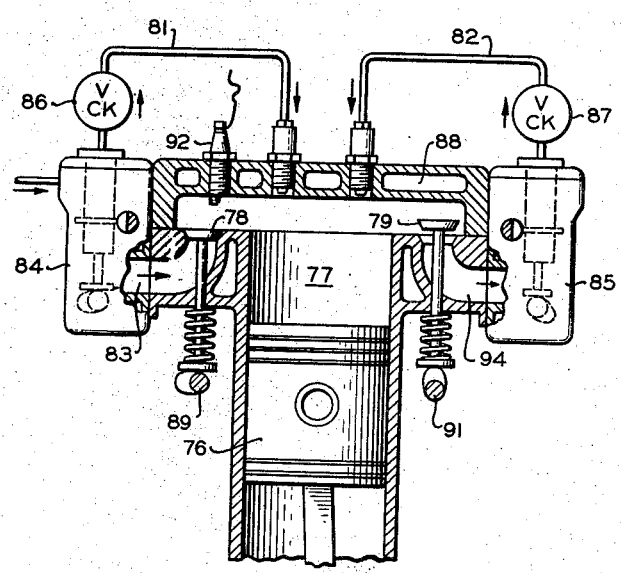
Figure 3 is a cross-sectional view of a portion of a second species comprising a 4-stroke cycle engine embodying the present invention.

The present invention is equally applicable to the engines generally designated as 4-cycle engines, or more correctly 4-stroke cycle engines, an example of which is shown in Figure 3. In these engines a piston 76 reciprocates in the cylinder 77, moving one way during each stroke, there being first a suction stroke during a substantial portion of which intake valve 78 is open, a compression stroke during which intake valve 78 and exhaust valve 79 are both closed, a power stroke during which these valves remain closed, and an exhaust stroke during the substantial portion of which exhaust valve 79 is opened. In the present invention the improvement comprises the steps of injecting a liquefied normally gaseous fuel from line 81 into the chamber 77 during the first portion of the compression stroke, and injecting a liquid normally liquid fuel 82 into said chamber during the latter portion of said compression stroke.

In Figure 3 because of the suction stroke, it is not necessary to have any compressor on air intake manifold 83. The injection pumps 84 and 85 and the check valves 86 and 87 may be the same as in Figure 1, the engine may be cooled by water or other suitable fluid in space 88, and the position of inlet valve 78 and exhaust valve 79 is controlled by cams on cam shafts 89 and 91, respectively, which may be geared to the usual crankshaft (not shown). The ignition is caused by the injection of diesel fuel 82, but the exact moment of ignition may be stabilized by an auxiliary ignition means such as spark plug 92 actuated by a suitable ignition system (not shown but well known in the automotive art). Instead of spark plug 92 the glow plug 93 of Figure 6 could be substituted, in fact the spark plug 92 in Figure 3, the glow plug 93 of Figure 6, or no auxiliary ignition whatsoever of Figure 1, can be interchangeably used in all the modifications of the present invention, it being preferred in each to not have any auxiliary ignition, as shown in Figure 1.

In Figure 3 when valve 79 is open the burned gases exhaust through exhaust port 94.

The 4-stroke cycle of the engine of Figure 3 is shown in Figures 4a, 4b, 4c and 4d.

Figure 4A:
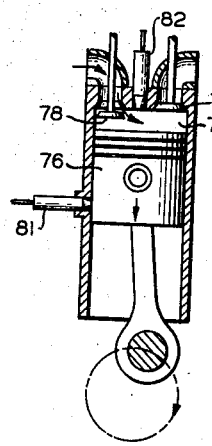
Figures 4a, 4b, 4c and 4d are diagrammatic cross-sectional views showing four points in the cycle of an engine of the type shown in Figure 3.

In Figure 4a the suction stroke has just started and piston 76 is moving down with intake valve 78 open drawing a charge of air into the cylinder 77.

Figure 4B:
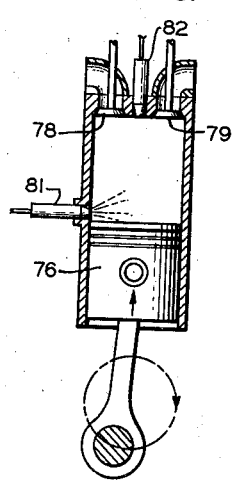

In Figure 4b the compression stroke has started with the piston 76 moving upwardly and both the valves 78 and 79 closed, and it will be noted that during the first portion of the compression stroke that liquid normally gaseous fuel is being injected through pipe 81.

Figure 4C:
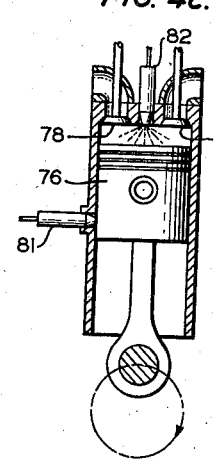

In Figure 4c liquid normally liquid fuel is being introduced through pipe 82 in the vicinity of top dead center at the start of the power stroke.

Figure 4D:
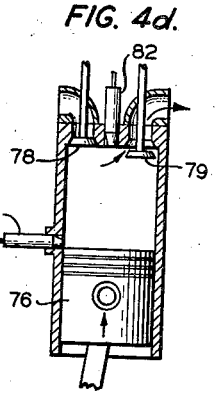

In Figure 4d it will be noted that piston 76 is moving upwardly with exhaust valve 79 open and the burned gases being forced out through exhaust manifold 94 by the upwardly moving piston.

Figure 5A:
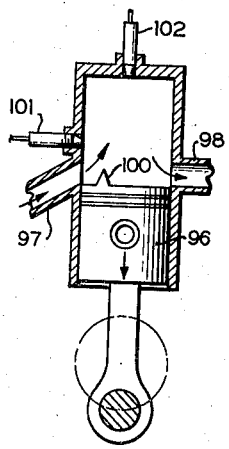
Figures 5a, 5b and 5c are diagrammatic cross-sectional views of a third species comprising a 2-stroke cycle engine which does not employ valves, showing three points in its cycle.
Figure 5B:
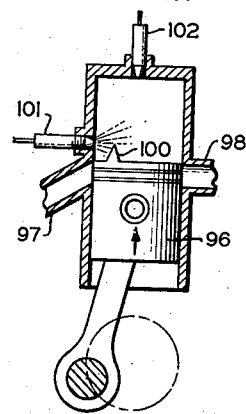
Figure 5C:
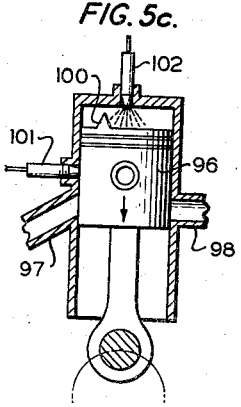

Figures 5a, 5b and 5c are a diagrammatic cross-sectional view of a third species comprising a 2-stroke cycle engine which does not employ valves, showing three points in its cycle, embodying the present invention.

Figure 5a shows the latter half of power and exhaust stroke with the piston near bottom dead center, and air from the atmosphere, or from a compressor like 18 of Figure 1, is rushing in through intake manifold 97 and scavenging exhaust gases out exhaust 98. Piston 96 is preferably provided with a vane 100 for deflecting gas entering inlet 97, and causing gas movement in the general directions indicated by the arrows.

Figure 5b is taken a little during the first portion of the compression portion of the stroke where it will be noted that piston 96 has closed both intake port 97 and exhaust port 98, and at this moment liquefied normally gaseous fuel is being injected through pipe 101.

Figure 5c is still later in the same cycle. Piston 96 is about top dead center and the liquid normally liquid fuel is then being injected through pipe 102.

Figure 6:
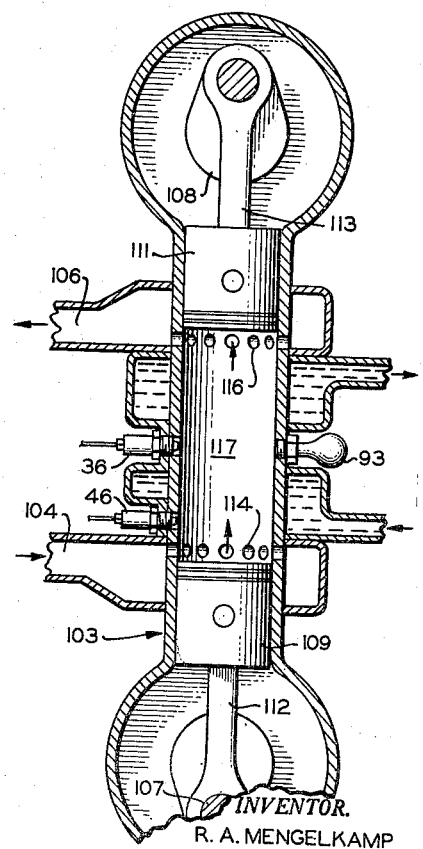
Figure 6 is a cross-sectional view of a fourth species comprising an opposed piston dual-fuel compression-ignition engine in which the ignition is aided by a glow plug.

The present invention is not limited to single piston engines, but can be applied to those having opposing pistons as shown in Figure 6. In Figure 6 is shown what known as an opposing, or double-piston, engine, which is of the uniflow type, having no valves aside from the pistons, which embodies the present invention and is a dual-fuel compression-ignition internal-combustion 2-stroke cycle engine generally designated as 103. An air compressor similar to 18 of Figure 1 is employed to furnish air under pressure to intake manifold 104, and 106 is the exhaust manifold. Crankshafts 107 and 108 are geared together in any suitable manner and are connected to pistons 109 and 111, respectively, by the usual connecting rods 112 and 113, respectively, to move pistons 109 and 111 toward and away from each other simultaneously. When pistons 109 and 111 are farthest apart they uncover inlet ports 114 and outlet ports 116, respectively, at which time the superior air pressure in 104 over the pressure in exhaust manifold 106 blows air through the cylinder 117 in the direction shown by the arrows scavenging the same of the combustion gases. The cycle is the same as shown in Figures 2a to 2e, the only difference being in the form of the exhaust valve 116 being different from exhaust valve 49 of Figure 1.

While not essential, when using a low cetane diesel fuel, it is often desirable to have auxiliary ignition means 93 which is shown in the form of a glow plug of any type known to the prior art. Such glow plugs may be originally activated by heating the same with a blow-torch, or they may be electrically heated (not shown) or otherwise heated, all as taught by the prior art. The glow plug provides a hot spot which ignites the fuel when a predetermined compression is reached.

The injection nozzle 36 for the diesel fuel, and the injection nozzzle 46 for the liquefied petroleum gas have been given the same numerals in Figure 6 as in Figure 1 because they, and the fuel supply systems, injection pumps and the like (shown in Figure 1 but not shown in Figure 6) are identical with those in Figure 1. As pointed out above it is generally preferred to eliminate glow plug 93 and rely on compression-ignition alone.

The essential feature of the present invention is keeping the LPG from tank 44 in the liquid state until after it leaves the metering system 38 through check valve 118, and preferably until after it passes through supply nozzle 46 into cylinder 14 in the embodiment shown in Figure 1. Since the fuel metering system of an engine is exposed to heat from engine 11, and therefore nearly always hotter than fuel tank 44, it is necessary that either a pump 63 be used to raise the pressure of the liquid fuel as it approaches the metering system, or else it is necessary to cool the liquid fuel as in cooler 67, or the liquid fuel will vaporize. Either one, or both, of the pump 63, or cooler 67, is essential, and both are preferred. It is preferred to locate the cooler 67 between the fuel pump 63 and the injection pump 43. This cooling of the fuel, by means of a separate cooling fluid increases the cooling effect occurring in the cylinder 14 by the liquid sprayed through nozzle 46 and makes it possible to operate with a little lower injection pressure, which is desirable when operating under high ambient temperatures.

It is obvious that the present invention is adapted to be used on engines of vehicles, as well as engines applied to stationary installations.

While the invention has been described above as applied to a number of different cycles of a dual-fuel engine operations, it is to be understood that the invention is also applicable to any of the other numerous cycles of dual-fuel engines already known in the prior art.

EXAMPLES

In order to demonstrate the advantages of the present invention, a GM3-71 diesel engine was modified as shown in Figure 1, except that to avoid the greater expense and difficulty of cutting through the water jacket, spray nozzle 46 was not located as shown, but instead was installed during liquid propane injection tests to inject the liquid propane through gas port 50A cut through the removable cylinder sleeve 12, which pipe 50 was connected to during tests using gas. This engine 11 was a three cylinder two cycle engine with a 16:1 compression ratio. In effect, this had the same result as if valve 60 was opened and valve 55 was closed shutting off line 50. When employing gaseous propane, or other gases, valve 60 was closed and valve 55 was open, and dry natural gas, or gaseous propane, or mixtures of the same were metered and introduced through pipe 50 to intake manifold 54, from which they passed, mixed with air from blower 18, into intake ports 56 whenever piston 13 was low enough in cylinder 12 to uncover the ports 56.

Incipient detonation was detected audibly aided by a Phillips 66 electronic gating knockmeter and E-1 pickup (not shown). Test conditions are listed in the following Tables I to III.

One test fuel was technical grade propane, which contains not less than 95 mol percent propane, the principal impurities being ethane and isobutane. The sulfur content did not exceed 0.010 weight percent. The density at 60° F. was about 4.24 pounds per gallon and the vapor pressure at 70, 105 and 130° F. was respectively about 125, 200, and 275 p. s. i. a. The initial and dry boiling points were about −50 and −40° F., respectively.

A second test fuel was technical grade N-butane of similar purity.

A third test fuel was natural gas of 0.66 specific gravity.

The diesel fuel, or pilot oil, was a kerosene from the Okmulgee refinery of 51.4 cetane number and 538° F. point.

In Table I all the runs except Nos. 5 and 6 were made with 12.7 cubic mm. of said pilot oil injected at 36 of Figure 1 at about top dead center to ignite the charge at approximately 10° after top dead center.

In runs Nos. 1 and 2 valve 60 was closed, valve 55 open, and the optimum mixture of air from blower 19 and said 0.66 specific gravity natural gas from pipe 50 were introduced into the combustion chambers 14 through ports 56 to obtain the highest brake horsepower at the level of incipient knocking as measured by said Phillips 66 electronic gating knockmeter.

Runs Nos. 3 and 4 were the same as runs Nos. 1 and 2 except that said technical grade propane in gaseous form was substituted for said natural gas.

Runs Nos. 5 and 6 were the same as runs Nos. 1 and 2 except that valve 55 was also closed and said pilot injection became the sole fuel injection and was varied to obtain the highest brake horsepower measured the same way.

Runs Nos. 7 and 8 were the same as runs Nos. 3 and 4 except that valve 55 was closed and valve 60 opened and said propane was liquid and injected as a liquid spray through a nozzle similar to 46 into the chambers 14.

Table I
DUAL-FUEL ENGINE PERFORMANCE WITH VARIOUS FUELS

| Run No. | Engine Speed (R. P. M.) | Primary Fuel | Brake H. P. (Knock Limited) | B. t. u./ B. H. P.-hr. |
|---|---|---|---|---|
| 1 | 1,375 | Natural Gas | 73.0 | 15,960 |
| 2 | 1,700 | do | 91.0 | 15,900 |
| 3 | 1,375 | Propane Gas | 61.0 | 14,800 |
| 4 | 1,700 | do | 64.0 | 15,100 |
| 5 | 1,375 | Diesel Fuel | 60.0 | 9,450 |
| 6 | 1,700 | do | 70.0 | 9,350 |
| 7 | 1,375 | Liquid Propane | 64.2 | 12,170 |
| 8 | 1,700 | do | 71.9 | 12,420 |

From Table I it will be apparent that for the combination of high knock limited horsepower and low specific fuel consumption in British thermal units per brake horsepower hour that liquid propane injection of runs 7 and 8 is superior, and that liquid propane injection is superior to gaseous propane in both of these factors.

Further data from said runs Nos. 7 and 8 were obtained, and are listed in Table II.

Table II
DUAL-FUEL DIESEL ENGINE PERFORMANCE WITH LIQUID PROPANE INJECTION

| Run No. | 7 | 8 |
|---|---|---|
| Engine Speed (R. P. M.) | 1,375 | 1,700 |
| Load (lbs.) | 140 | 127 |
| B. t. u. B. H. P. (knock limited) | 64.2 | 71.9 |
| Temperatures (° F.): | | |
| Water Out | 200 | 200 |
| Lube Oil | 210 | 210 |
| Air Intake | 87 | 88 |
| Wet Bulb | 72 | 72 |
| Dry Bulb | 77 | 77 |
| Propane Flow (lbs./hr.) | 30.0 | 35.0 |
| Pilot Oil Charge (Cu. mm./cyl.) | 12.7 | 12.7 |
| B. S. F. C. (B. t. u./B. H. P.-Hr.) | 12,170 | 12,420 |
| Pressures: | | |
| Propane Tank (p. s. i. g.) | 150 | 150 |
| Lube Oil (p. s. i. g.) | 44 | 46 |
| Barometer (in. Hg) | 29.221 | 29.221 |

Runs Nos. 9 and 10 were made similar to runs Nos. 3 and 4, but run No. 9 was without water injection and run No. 10 was with water injected in a manner similar to spray 23 in Figure 1.

It has been well established that water injection both cools and humidifies the fuel-air charge. This tends to suppress detonation in Otto cycle engines.

Runs Nos. 9 and 10 were conducted to determine the quantitative effect of water injection in the dual fuel engine. Distilled water was injected into the intake air stream and a knock limited brake horsepower increase of 8.3 percent was observed when using propane as the primary fuel. The test data are shown in Table III. A higher power output might have been realized if apparatus for spraying the water into the air stream more homogeneously had been available.

Table III
EFFECT OF WATER INJECTION IN THE INTAKE AIR STREAM

| Run No. | 9 | 10 |
|---|---|---|
| Engine Speed (R. P. M.) | 1,600 | 1,600 |
| Load (lbs.) | 120 | 130 |
| B. H. P. | 64.0 | 69.3 |
| B. H. P. Increase (percent) | | 8.3 |
| Temperatures (° F.): | | |
| Propane Gas | 120 | 118 |
| Water Out | 201 | 200 |
| Lube Oil Sump | 205 | 206 |
| Wet Bulb | 77 | 78 |
| Dry Bulb | 96 | 95 |
| Exhaust Cyl.— | | |
| 1 | 610 | 625 |
| 2 | 685 | 700 |
| 3 | 625 | 635 |
| Intake Air | 98 | 97 |
| Pressures: | | |
| Propane (p. s. i. g.) | 19.0 | 17.0 |
| Lube Oil (p. s. i. g.) | 50 | 50 |
| Barometer (in. Hg) | 29.351 | |
| Pilot Oil (p. s. i. g.) | 45 | 45 |
| Air Box (in. Hg) | 6.9 | 6.9 |
| Exhaust (in. Hg) | 0.55 | 0.55 |
| Venturi (p. s. i. g.) | 9.0 | 12.0 |
| Corrected Propane (C. F. M.) | 5.46 | 5.63 |
| Lbs. Water/lb. air injected | 0 | 0.0484 |
| Pilot Oil Charge 12.7 cu. mm./cylinder. | | |

We have found that the combustion process in a dual fuel engine, and thus the knock-limited brake horsepower of the engine, can be improved by injecting liquid LPG directly into the working cylinder of the engine. In Table I is shown a comparison of knock-limited brake horsepower of a modified GM3–71 diesel fuel engine operated on various fuels. The conditions obtaining during the performance tests of the various fuels were substantially the same for each test. The operating conditions during the performance tests were substantially those given in Table II when liquid propane was used. The knock-limited brake horsepower at 1375 and 1700 R. P. M. with liquid propane injection was 64.2 and 71.9, respectively, as compared to 61.0 and 64.0 for gaseous propane induction. The diesel rated continuous horsepower at the same conditions was 60.0 and 70.0, respectively.

We have also found that the specific fuel consumption can be improved by injecting liquid LPG directly into the cylinder of a dual fuel engine. In Table I the specific fuel consumption at 1375 and 1700 R. P. M. with liquid propane injection is 12,170 and 12,420 B. t. u./B. H. P.-hr., respectively, as compared to 14,800 and 15,100 B. t. u./B. H. P.-hr. for gaseous propane induction, even though the point of injection and induction was the same in these comparative tests, at 50A in runs 1 to 4, 7 and 8. An even greater advantage would have been shown for liquid propane if injected through 46 in the position shown in Figure 1 after the valves 49 and openings 56 had been closed as in Figure 2b. The diesel rated specific fuel consumption at the same conditions in runs 5 and 6, except that all the diesel fuel was injected through nozzle 36 as described above, was 9450 and 9350 B. t. u./B. H. P.-hr., respectively. The higher specific fuel consumption with gaseous propane induction may be attributed to the fact that part of the air-fuel mixture is lost during scavenging, whereas with the present invention very little, if any, fuel is lost during scavenging thus contributing to a more efficient operation of the engine. Obviously, an even lower specific fuel consumption would have occurred had the liquid propane in runs 7 and 8 been injected as shown in Figure 2b after valves 49 and openings 56 had been closed, as in the preferred form of the present invention, and it is believed the specific fuel consumption would then have been as low, or lower, than that of the diesel oil alone in runs 5 and 6.

While several specific embodiments of the invention have been disclosed for illustrative purposes, it is obvious the invention is not limited thereto.

Having described our invention, we claim:

1. The process of operating a dual-fuel internal-combustion engine having a cylinder and a piston reciprocating in said cylinder, and thereby forming a variable volume combustion chamber, comprising the cycle of steps of charging the chamber with a free-oxygen containing gas, injecting a liquefied normally gaseous fuel into said gas to form a first charge, compressing said first charge, injecting a liquid normally liquid fuel into said compressed first charge to form a second charge, igniting said second charge, and applying the expanding gases from the combustion resulting from said ignition to said piston to move the same through said cycle.

2. The process of claim 1 in which the igniting of said second charge is by compression-ignition and said normally liquid fuel has a cetane number higher than 22 to initiate said compression ignition.

3. The process of claim 1 in which the igniting of said second charge is by spark ignition.

4. The process of claim 1 in which the liquefied normally gaseous fuel comprises essentially a hydrocarbon selected from the group consisting of hydrocarbons having from one to five carbon atoms in each molecule thereof, and mixtures of such hydrocarbons.

5. The process of operating a dual-fuel internal-combustion engine having a cylinder and a piston reciprocating in said cylinder and thereby forming a variable volume combustion chamber, comprising the steps of scavenging said cylinder with air, injecting a liquefied normally gaseous fuel into said air to form a first charge, compressing said first charge, injecting a liquid normally liquid fuel having a cetane number greater than 22 into said compressed first charge to form a second charge, igniting said second charge by compression-ignition, applying the expanding gases from the combustion thereof resulting from said ignition to said piston to move the same in a direction expanding the volume of said combustion chamber and venting the combustion gases from said chamber before said piston completes said last movement in said direction.

6. In a four-stroke dual-fuel internal-combustion engine cycle, in which a piston reciprocates in a cylinder, moving one way during each stroke, in which there is a suction stroke, a compression stroke, a power stroke, and an exhaust stroke, the improvement comprising the steps of injecting a liquefied normally gaseous fuel into said cylinder during the first portion of the compression stroke, and injecting a liquid normally liquid fuel into said cylinder during the latter portion of said compression stroke.

7. In a two-stroke dual-fuel internal-combustion engine cycle, in which a piston reciprocates in a cylinder, moving one way during each stroke, in which there is an air scavenging and compression stroke, and a power and exhaust stroke, the improvement comprising the steps of injecting a liquefied normally gaseous fuel into said cylinder during the first portion of the compression portion of said air scavenging and compression stroke, and injecting a liquid normally liquid fuel into said cylinder during the latter portion of said compression portion of said air scavenging and compression stroke.

8. A dual-fuel internal-combustion engine comprising in combination an engine cylinder, a piston disposed to reciprocate in said cylinder, said piston and cylinder forming a variable volume combustion chamber, a first pressure storage tank for liquefied normally gaseous fuel, a first injector for said liquefied fuel disposed to inject the same into said chamber, a first supply conduit connecting said first tank and said first injector, a pump in said conduit for supplying said liquefied fuel to said injector at a greater pressure than the vapor pressure thereof, a cooler in heat exchange with said first conduit, a relief recycle line connecting said first supply conduit downstream of said pump with said first storage tank, a fluid pressure relief valve controlling flow through said relief line, a second tank for liquid normally liquid fuel, a second injector for said liquid fuel disposed to inject the same into said chamber, a second supply conduit connecting said second tank and said second injector, and means to move liquid fuel through said second supply conduit.

9. A dual-fuel internal-combustion engine comprising in combination an engine cylinder, a piston disposed to reciprocate in said cylinder, said piston and cylinder forming a variable volume combustion chamber, a first pressure storage tank for liquefied normally gaseous fuel, a first injector for said liquefied fuel disposed to inject the same into said chamber, a first supply conduit connecting said first tank and said first injector, a pump in said conduit for supplying said liquefied fuel to said injector at a greater pressure than the vapor pressure thereof, a relief recycle line connecting said first supply conduit downstream of said pump with said first storage tank, a fluid pressure relief valve controlling flow through said relief line, a second tank for liquid normally liquid fuel, a second injector for said liquid fuel disposed to inject the same into said chamber, a second supply conduit connecting said second tank and said second injector, and means to move liquid fuel through said second supply conduit.

10. A dual-fuel internal-combustion engine comprising in combination an engine cylinder, a piston disposed to reciprocate in said cylinder, said piston and cylinder forming a variable volume combustion chamber, a first pressure storage tank for liquefied normally gaseous fuel, a first injector for said liquefied fuel disposed to inject the same into said chamber, a first supply conduit connecting said first tank and said first injector, a pump in said conduit for supplying said liquefied fuel to said injector at a greater pressure than the vapor pressure thereof, a cooler in heat exchange with said first conduit, a second tank for liquid normally liquid fuel, a second injector for said liquid fuel disposed to inject the same into said chamber, a second supply conduit connecting said second tank and said second injector, and means to move liquid fuel through said second supply conduit.

11. A dual-fuel internal-combustion engine comprising in combination an engine cylinder, a piston disposed to reciprocate in said cylinder, said piston and cylinder forming a variable volume combustion chamber, a first pressure storage tank for liquefied normally gaseous fuel, a first injector for said liquefied fuel disposed to inject the same into said chamber, a first supply conduit connecting said first tank and said first injector, a pump in said conduit for supplying said liquefied fuel to said injector at a greater pressure than the vapor pressure thereof, a second tank for liquid normally liquid fuel, a second injector for said liquid fuel disposed to inject the same into said chamber, a second supply conduit connecting said second tank and said second injector, and means to move liquid fuel through said second supply conduit.

12. In the combination of claim 11, a spark plug in said chamber.

13. In the combination of claim 11, means to supply air to said combustion chamber, and means to spray water into said air.

14. In the process of claim 1, the step of spraying water into said free-oxygen containing gas.

References Cited in the file of this patent

UNITED STATES PATENTS 673,160    Diesel _____ Apr. 30, 1901